United States Patent
Saulnier et al.

(10) Patent No.: US 9,503,201 B2
(45) Date of Patent: Nov. 22, 2016

(54) ACOUSTIC-ELECTRIC CHANNEL CONSTRUCTION AND OPERATION USING ADAPTIVE TRANSDUCER ARRAYS

(71) Applicant: RENSSELAER POLYTECHINC INSTITUTE, Troy, NY (US)

(72) Inventors: Gary J. Saulnier, East Greenbush, NY (US); Kyle R. Wilt, Sand Lake, NY (US); Henry A. Scarton, Troy, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 126 days.

(21) Appl. No.: 14/429,315

(22) PCT Filed: Oct. 9, 2013

(86) PCT No.: PCT/US2013/063977
§ 371 (c)(1),
(2) Date: Mar. 18, 2015

(87) PCT Pub. No.: WO2014/066038
PCT Pub. Date: May 1, 2014

(65) Prior Publication Data
US 2015/0244473 A1 Aug. 27, 2015

Related U.S. Application Data

(60) Provisional application No. 61/718,796, filed on Oct. 26, 2012.

(51) Int. Cl.
*H04B 11/00* (2006.01)
*H04R 17/00* (2006.01)
*H04R 31/00* (2006.01)

(52) U.S. Cl.
CPC ............... *H04B 11/00* (2013.01); *H04R 17/00* (2013.01); *H04R 31/00* (2013.01); *H04R 2201/401* (2013.01); *Y10T 29/49005* (2015.01)

(58) Field of Classification Search
CPC ...... H04B 11/00; H04R 31/00; H04R 17/00; H04R 2201/401; Y10T 29/49005
See application file for complete search history.

(56) References Cited

U.S. PATENT DOCUMENTS 4,211,948 A   7/1980   Smith
4,514,247 A   4/1985   Zola (Continued)

FOREIGN PATENT DOCUMENTS

WO       03056727 A1    7/2003
WO    2011027169 A1    3/2011

OTHER PUBLICATIONS

Supplemental European Search Report for corresponding European patent application No. EP 13849188.1, dated Aug. 5, 2016.

*Primary Examiner* — Daniel Pihulic
(74) *Attorney, Agent, or Firm* — Notaro, Michalos & Zaccaria P.C.

(57) ABSTRACT

A method for transmitting power, data, and instructions using acoustic-electric channels having one or more transducer arrays, and to compensate for imperfect alignment of transducer arrays. Transducer arrays each include multiple transducer elements coupled to a channel barrier. Each element can be independently controlled, and misaligned transducers are selectively deactivated to improve overall channel performance. Arrays are optimized by testing different combinations of elements, and the combinations which are the most effective or efficient are used for transmissions. The system and the optimization features can be used to communicate between surfaces which have relative movement, such as between water craft hulls. Optimization can be periodic or constant to compensate for movement within the channel. The arrays can be used with curved substrates. Methods of designing adaptable arrays are also provided.

26 Claims, 10 Drawing Sheets

(56) References Cited

U.S. PATENT DOCUMENTS

| | | |
|---|---|---|
| 4,546,459 A | 10/1985 | Congdon |
| 5,311,095 A | 5/1994 | Smith et al. |
| 5,396,142 A | 3/1995 | Koblanski |
| 5,460,046 A | 10/1995 | Maltby et al. |
| 5,852,337 A | 12/1998 | Takeuchi et al. |
| 5,869,767 A | 2/1999 | Hayward et al. |
| 6,314,057 B1 | 11/2001 | Solomon et al. |
| 6,321,428 B1 | 11/2001 | Toda et al. |
| 6,470,996 B1 | 10/2002 | Kyle et al. |
| 6,546,803 B1 | 4/2003 | Ptchelintsev et al. |
| 6,587,540 B1 | 7/2003 | Johnson et al. |
| 8,605,548 B2 | 12/2013 | Froelich |
| 2012/0155220 A1* | 6/2012 | Lee .................. G01S 11/14 367/129 |
| 2015/0034305 A1 | 2/2015 | Tips |
| 2015/0244473 A1* | 8/2015 | Saulnier .................. H04B 11/00 367/134 |

* cited by examiner

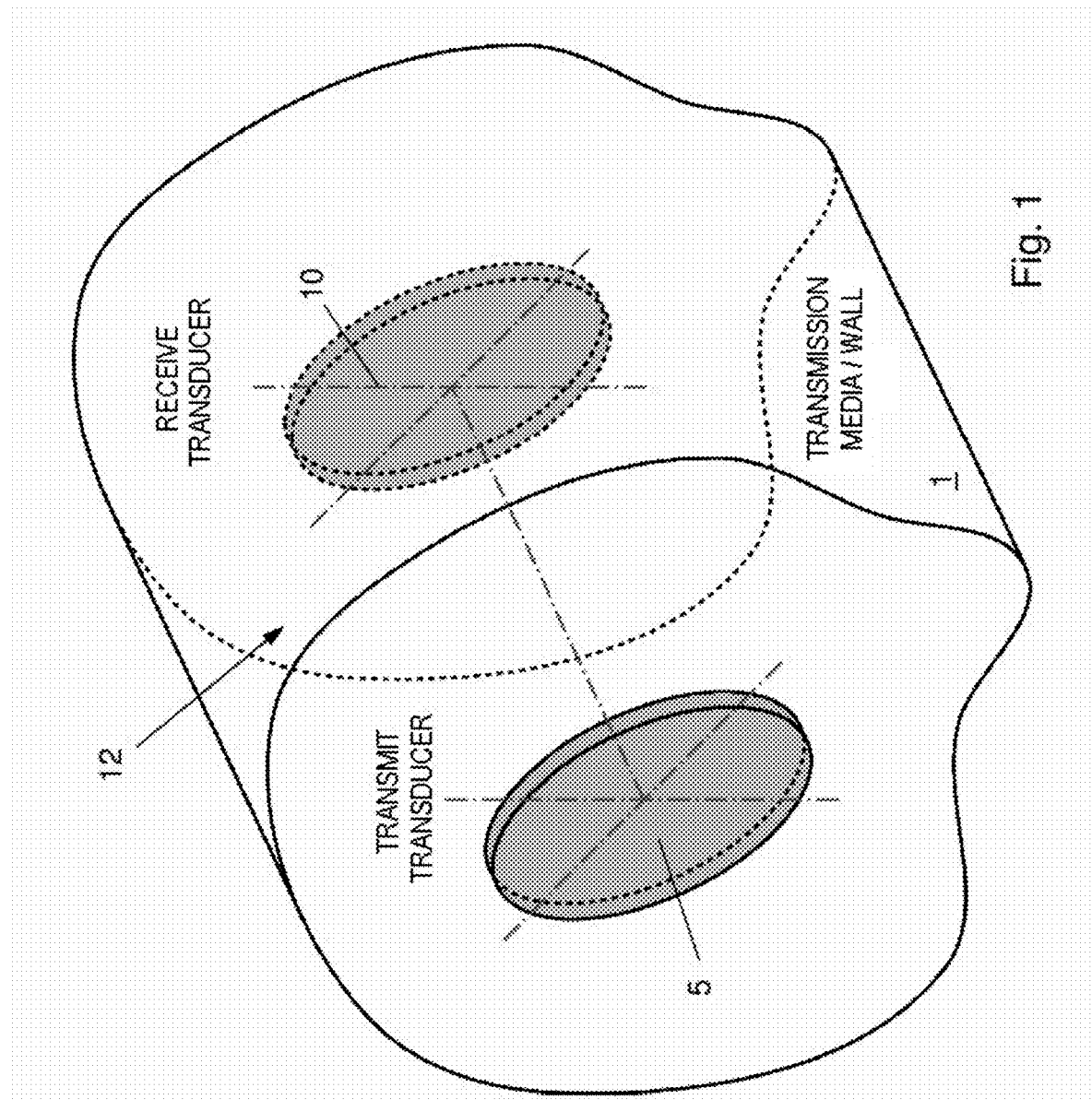

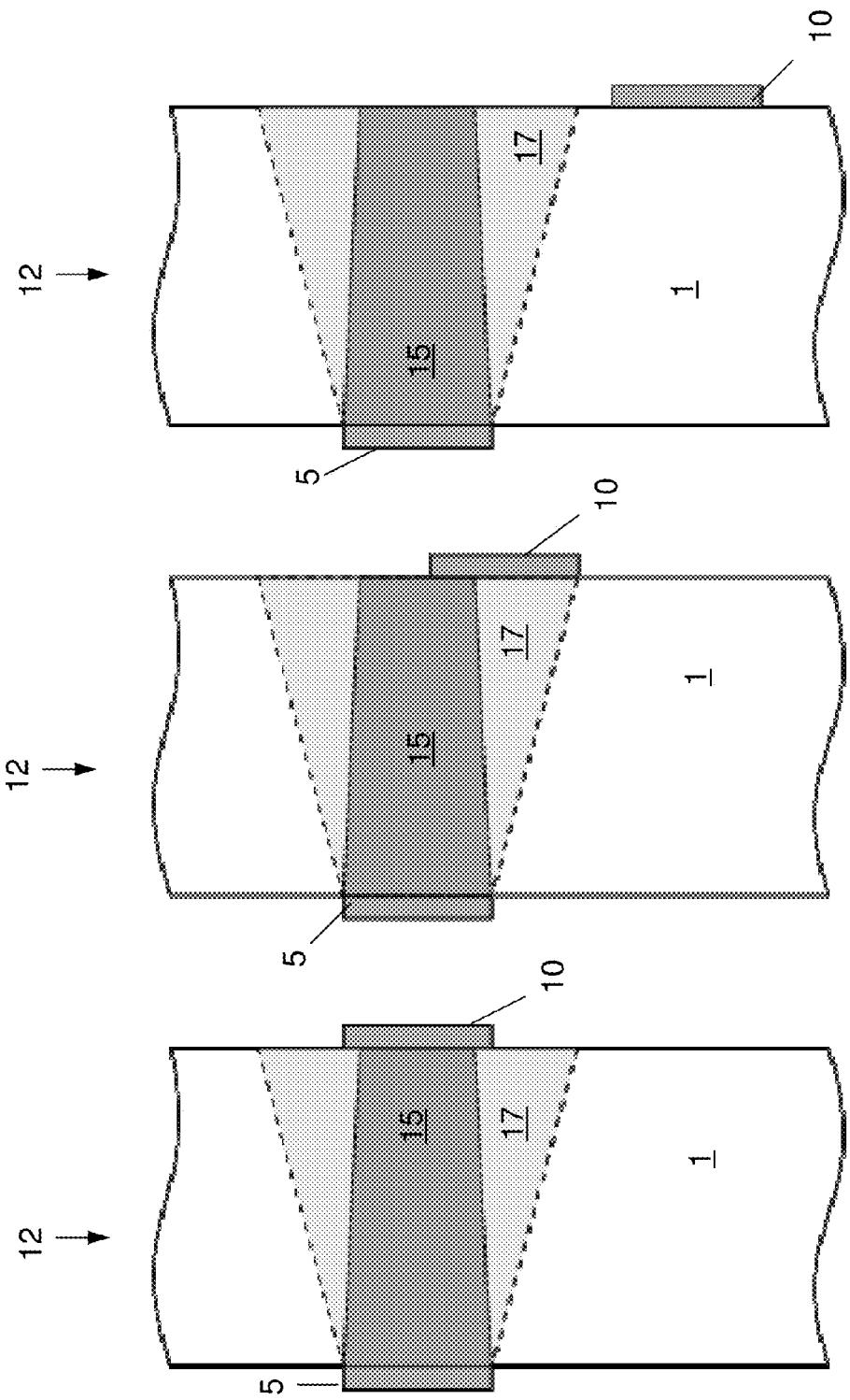

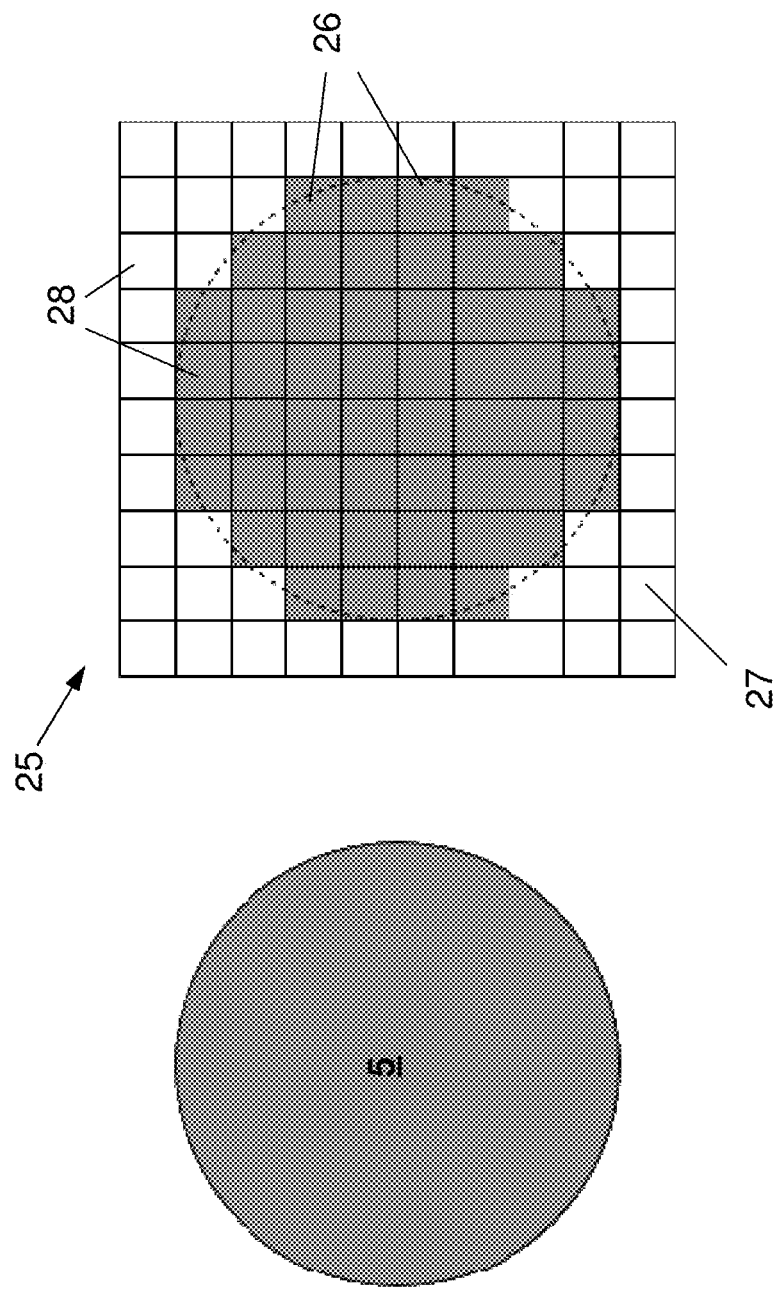

ACOUSTIC-ELECTRIC CHANNEL CONSTRUCTION AND OPERATION USING ADAPTIVE TRANSDUCER ARRAYS

CROSS-REFERENCE TO RELATED APPLICATION

This application claims priority on U.S. provisional patent application 61/718,796 filed Oct. 26, 2012 which is incorporated herein by reference.

FIELD AND BACKGROUND OF THE INVENTION

The present invention relates generally to the field of acoustics, and in particular to transducers, to communication and power transmission using arrays of transducers, and to optimizing transducer performance when alignment is imperfect or when transducers may move over time.

A transducer is a device that converts a signal in one form of energy to another form of energy. This can include electrical energy, mechanical energy, electromagnetic and light energy, chemical energy, acoustic energy, and thermal energy, among others. While the term "transducer" often refers to a sensor or a detector, any device which converts energy can be considered a transducer.

Transducers are often used in measuring instruments. A sensor is used to detect a parameter in one form and report it in another form of energy, typically as an electrical signal. For example, a pressure sensor might detect pressure—a mechanical form of energy—and convert it to electricity for display for transmission, recording, and/or at a remote location. A vibration powered generator is a type of transducer that converts kinetic energy derived from ambient vibration to electrical energy. Transducers can be particularly useful for transferring power and/or energy through surfaces when it is desirable not to create physical openings in the surface, such as for taking readings inside a pressurized chamber, or through the hull or a water craft.

A transducer can also be an actuator which accepts energy and produces movement, such as vibrational energy or acoustic energy. The energy supplied to an actuator might be electrical or mechanical, such as pneumatic or hydraulic energy. An electric motor and a loudspeaker are both actuators, converting electrical energy into motion for different purposes.

Some transducers have multiple functions, both detecting and creating action. For example, a typical ultrasonic transducer switches back and forth many times a second between acting as an actuator to produce ultrasonic waves, and acting as a sensor to detect ultrasonic waves and converting them into electrical signals. Analogously, rotating a DC electric motor's rotor will produce electricity, and voice-coil speakers can also function as microphones.

Piezoelectric materials can be used as transducers to harvest even low levels of mechanical energy and convert them into electrical energy. This energy can be suitable for powering wireless sensors, low power microprocessors, or charging batteries. A piezoelectric sensor or transducer is a device that uses a piezoelectric effect to measure pressure, acceleration, strain, or force by converting those physical energies into an electrical charge. The piezoelectric effect is a reversible process in that materials exhibiting the direct piezoelectric effect—generation of an electrical charge as a result of an applied mechanical force—also exhibit the reverse piezoelectric effect—generating a mechanical movement when exposed to an electrical charge or field. Thus, piezoelectric transducers can also work in reverse, turning electrical energy into physical vibrational energy and vice versa. Piezoelectric transducers have the dual advantages of working using low energy levels, and at a small physical size. Ultrasonic transducers may be piezoelectric transducers, applying ultrasound waves into a body, and also receiving a returned wave from the body and converting it into an electrical signal.

Construction of piezoelectric-based acoustic-electric channels as a means to transmit both power and data across obstructions, such as pressure vessel walls, has been of significant interest as a way to maintain structural integrity by minimizing the number of mechanical penetrations. It has been shown that these types of penetration replacement systems are capable of fulfilling the required connection characteristics of high power delivery and high data rates, while maintaining the structural integrity of the wall by avoiding the need for significant wall modifications, particularly openings. A typical simple "channel" is composed of a transmitting piezoelectric transducer (transmit transducer) coupled to one side of a wall and a receiving transducer (receive transducer) coupled to the opposite wall surface. An example of such a channel is illustrated in FIG. 1, where the transmit and receive transducers are circular "disk" transducers whose axes are coaxially aligned. Ideally, the transmit and receive transducer or transducers are perfectly aligned across the wall though, as will be explained below, this is not always the case.

These types of channels have been shown to be capable of high data-rate and/or high-power, high-efficiency operation. Work done at Rensselaer Polytechnic Institute has demonstrated that a single data channel constructed using 4 MHZ resonance transducers operating through a 63.5 mm (2.5 in.) thick steel wall is capable of over 12 Mbps throughput using complex communication techniques. See Lawry, T. J., 2011, "A High Performance System for Wireless Transmission of Power and Data Through Solid Metal Enclosures," Ph. D. Thesis, Rensselaer Polytechnic Institute, Troy, N.Y., and Lawry, T. J., Saulnier, G. J., Ashdown, J. D., Wilt, K. R., Scarton, H. A., Pascarelle, S., and Pinezich, J. D., 2011, "Penetration-Free System for Transmission of Data and Power Through Solid Metal Barriers," In Military Communications Conf. (MILCOM), 2011, pp. 389-395.

In using multiple, parallel, simultaneously operating channels assembled onto a wall at very close proximity and applying multiple-input-multiple-output (MIMO) techniques to mitigate crosstalk among the channels, it has been shown that the aggregate data-rate throughput approximately increases proportionally with the number of parallel channels. See Ashdown, J. D., 2012, "High-Rate Ultrasonic Data Communication Through Metallic Barriers Using MIMO-OFDM Techniques," Ph. D. Thesis, Rensselaer Polytechnic Institute, Troy, N.Y.; and Ashdown, J. D., Saulnier, G. J., Wilt, K. R., and Scarton, H. A., "High-Rate Ultrasonic Communication Through Metallic Barriers Using MIMO-OFDM Techniques," Military Communications Conference (MILCOM), 2012.

Regarding power transmission, relatively high-efficiency and high-power operation has been demonstrated through thick metal walls. See Wilt, K. R., Scarton, H. A., Saulnier, G. J., Lawry, T. J., and Ashdown, J. D., 2012, "High-Power Operation of Acoustic-Electric Power Feedthroughs Through Thick Metallic Barriers," In Proc. ASME 2012 International Mechanical Engineering Congress and Exposition, and Wilt, K. R., 2012, "Experimentation and Modeling of Piezoelectric-Based Ultrasonic Acoustic-Electric Channels," Ph. D. Thesis, Rensselaer Polytechnic Institute, Troy, N.Y. That work included demonstrating use of channels composed of 1 MHZ resonance transducers (1 in. diameter) across 57.2 mm (2.25 in.) thick metal test blocks. The channels were optimized and operated at high-power levels. The laboratory tests demonstrated the use of channels capable of upwards of 70% power transfer efficiency, while successfully delivering over 100 W (approximately 140 W maximum) to a dummy load resistor load. Other testing has demonstrated over 1 kW of delivered power through a thin metal wall using specialized transducer geometries. See Bao, X., Biederman, W., Sherrit, S., Badescu, M., Bar-Cohen, Y., Jones, C., Aldrich, J., and Chang, Z., 2008, "High-Power Piezoelectric Acoustic-Electric Power Feedthru for Metal Walls," In Proc. SPIE Conf. Industrial and Commercial Applications of Smart Structures Technologies, Vol. 6930, p. 69300Z.

One significant issue with transducer channel arrangement, including the above systems, is that the alignment of the transducers has a significant impact on the capabilities of the channel(s). For power delivery, even a small amount of misalignment results in a significant reduction in power transfer efficiency. For communications, a small amount of misalignment is somewhat less of an issue since the operational power levels are low, and because low communication signal transfer efficiency can generally be compensated for by using increased transmit power. Nevertheless, transducer misalignment can make the channel response more complex and can result in a reduced data communication rate. In multi-channel communications arrangements using multiple-input and multiple-output ("MIMO") techniques, the sensitivity to misalignment errors is not significantly increased, and may actually be reduced, relative to single channel arrangements. This is because MIMO arrangements can be used with techniques to utilize the crosstalk introduced between channels through the misalignment.

Transducer alignment is not a major concern in laboratory environments and some factory environments because precise placement of transducers is relatively trivial. Transducer installation and alignment can be much more difficult, however, when installations are done "in the field" or on previously fabricated structures. In many "real world" implementations, transducer alignment can involve significant dimensional error due to scale, surface inaccessibility, surface irregularity, inability to see both sides of a barrier simultaneously, and other factors. Additionally, in arrangements where the transmit and receive transducers do not share a common rigid mating medium, such as with transducers mounted on two plates that are not rigidly connected together and/or that have a liquid layer between them, transducer alignment may be variable.

FIGS. 2a, 2b and 2c illustrate three generalized alignment cases for a single pair of transducers. Note that the diagrams show some spreading of the acoustic energy beam as the distance from the transmit transducer (on the left) increases. In case (a), the transducers are perfectly aligned and the receive transducer (on the right) captures the maximum amount of the transmitted energy. Case (b) describes a partially aligned channel, where the receive transducer captures a fraction of the transmitted energy. This situation would result in a significant loss in power transfer efficiency and/or potential communications performance loss, such as higher error rates or reduced data transfer rates. The third case, case©, shows the receive transducer completely misaligned with the transmit transducer, resulting in a severely degraded channel.

Methods for aligning transducers across a rigid medium have been described where a non-destructive "pitch-catch" testing techniques are used to "peak" the channels. See Wilt, K. R, 2012, "Experimentation and Modeling of Piezoelectric-Based Ultrasonic Acoustic-Electric Channels," Ph. D. Thesis, Rensselaer Polytechnic Institute, Troy, N.Y., and Wilt, K. R., Scarton, N. A., Lawry, T. J., Saulnier, G. J., and Ashdown, J. D., 2012 "Method and Apparatus for an Acoustic-Electric Channel Mounting," U.S. patent application Ser. No. 13/559,164. Filed July 2012. The transducers are aligned by comparing a pressure amplitude signal, created by a stationary "pitching" transducer, at various locations on the opposite side of the barrier as measured by a "catching" transducer. The position on the opposite wall where the strongest signal is detected by the catching transducer is presumed to be directly opposite the pitching transducer sending the signal. Employing multiple pitch-catch channels (e.g., multiple pitching locations) can provide reasonably accurate alignment of the required transmit and receive transducers in some well-suited applications.

Nevertheless, given the losses associated with misalignment and the difficulty in achieving and/or maintaining alignment in some applications, methods and apparatus for optimizing operation despite transducer mis-alignment and alignment variability are needed. New and improved methods to operate misaligned and variably aligned acoustic-electric channels with minimal or even no performance loss will have a variety of applications.

The following references provide background for the instant invention, and are also incorporated to the extent that they might help enable various embodiments of the invention.

U.S. Pat. No. 5,869,767 teaches an ultrasonic transducer including a flexible transmitter, a flexible receiver array, and flexible electrodes for the transmitter and receiver. The elements of the transducer are arranged such that the transducer may be flexed for conformity with surfaces of test specimens of a variety of non-planar configurations.

U.S. Pat. No. 6,546,803 is an ultrasonic probe having a segmented ultrasonic transducer made up of a plurality of individual independent transducers, and a plurality of electrical connections linking each the piezoelectric transducer with a power source.

In U.S. Pat. No. 5,460,046, a method and an apparatus are provided for measuring the wall thickness of a pipeline through which a fluid flows. Each transducer is activated by periodic electrical pulses to cause transmission of acoustic signals in the pipeline fluid that are reflected by the pipeline interior and exterior walls. A plurality of multiple ultrasonic reflections from the pipe interior and exterior walls for each ultrasonic pulse produced by each transducer are analyzed employing a software algorithm embedded in the electronics within the pig body to provide a measurement of pipe wall thickness. By means of an odometer attached to the pig body, electrical signals are provided that reveal anomalies in the wall thickness of the pipeline relative to the distance traveled by the pig body so that an operator can thereby determine the location in the pipeline of wall thickness anomalies.

U.S. Pat. No. 5,311,095 describes an ultrasonic transducer array comprising a ceramic connector having an array of connector pads, a mismatching layer of electrically conducting material connected to the upper surface of the ceramic connector, a piezoelectric transducer chip connected to the mismatching layer, and separation means for dividing the piezoelectric chip into a plurality of transducer elements positioned in a two-dimensional array. Each one of the plurality of transducer elements is selectively connected to a corresponding one of the connector pads. Also disclosed are a two-dimensional ultrasound transducer array and a transducer array for ultrasound imaging.

U.S. Pat. No. 4,514,247 teaches a method for fabricating composite transducers by bonding together plates of active and passive materials to form a laminated block. The active material is preferably a piezoelectric ceramic. Thereafter, a series of cuts are made in the laminated block to obtain a composite plate wherein regions of active material are separated from one another by regions of passive material. The method provides composite transducers having fine structures which can be produced without the difficulty of assembling many small rods or sawing deep, narrow' grooves, as required by other methods.

U.S. Pat. No. 4,546,459 describes, among other aspects, a phased array transducer having a hollow cylindrical or tubular body and having a plurality of acoustic coupling ports and a single electro-acoustical transducer element operating in combination with the ports for providing a broadside vertical directivity pattern. In accordance with one embodiment of the invention for operation in an underwater environment, there is provided a hollow elongated cylindrical tube having closed ends and a plurality of pairs of substantially annular apertures or ports through the wall of the tube and spaced along the longitudinal dimension of the tube.

U.S. Pat. No. 4,211,948 describes an ultrasonic transducer array with high sensitivity for use in water tanks and with human subjects in steered beam imagers to make wide angle sector scans. The array has narrow transducer elements. Steered beam imagers are also known as phased array sector scanners, and the present front surface matched array makes possible wide angle sector scans with a total scan angle exceeding about 60 degrees.

U.S. Pat. No. 6,587,540 is an apparatus and method for imaging objects with wave fields. One embodiment includes two arrays facing each other, with their faces mutually parallel.

UK Patent GB2366603 describes a marine vessel having a plurality of tiles on its surface. Each tile has, integral therewith, an integrated circuit which is programmed to cause piezoelectric elements at the surface of the tile to modify the dynamic properties of the surface of the vessel. This enables turbulence to be reduced, acoustic reflections to be cancelled, escape of noise from the vessel to be eliminated, and acoustic signals to be transmitted as and when necessary. Selected elements act as sensors and others as drivers. The elements may be used on submarines or aircraft.

A 2007 thesis by one Isil Ceren Elmasli, submitted to Bilkent University, is said to describe a study of a two ceramic layer stacked transducer structure for short range underwater communications at high frequencies. The transducer structure has two electrical and two acoustic ports. Ceramic layers are matched to water load through quarter wavelength thick matching layers on each radiating face. It is shown that wide bandwidth operation can be maintained. The beam width of the structure is narrow due to end-fire effect of two back-to-back radiating elements. The document can be retrieved at: http://www.thesis.bilkent.edu.tr/0003273.pdf.

SUMMARY OF THE INVENTION

It is an object of the present invention to provide arrangements and methods to overcome problems caused by misaligned transducers, particularly transducer sets or arrays. This application also concerns the transfer of power and/or data through structures using acoustic-electric channels formed using piezoelectric transducers. More specifically, a method is described for mechanical construction and operation of single- or multi-channel piezoelectric-based acoustic-electric channel arrays which allow for some amount of alignment error or variability in the transducer alignment without significant loss in channel quality and performance. This method is introduced to compensate for the inability to precisely align transmitting and receiving transducers across a non-trivial barrier interface. Furthermore, a means for the overlap of channel arrays constructed to transmit power and/or data is discussed, which is useful for minimizing the footprint of such systems. These methods are useful is applications where it is difficult to achieve perfect array alignment, and applications where the arrays are mounted on movable surfaces.

Accordingly, methods and arrangements for acoustical transmission of at least one of power, instructions, and data through an acoustic-electric channel using piezoelectric transducer arrays are provided. A preferred arrangement includes a channel medium for passing acoustical transmissions, the channel medium comprising a first surface and a second surface and being capable of transmitting acoustical energy there through.

A send arrangement is coupled to the first surface, and a receive arrangement is coupled to the second surface. The send and receive arrangements are positioned at least partially on opposite sides of the same region of the channel medium. Preferably they are aligned as best possible, but the system compensates for and accommodates imperfect alignment.

The transmission send arrangement comprises a send array which is coupled to the first surface. The send array comprises a plurality of send elements, and each send element typically comprises a transducer. Preferably each element can be controlled independently of other send elements in the same array. The receive arrangement comprises at least one receive transducer which may optionally be an element within a receive array, but which may also be a single transducer, etc.

It is preferred to optimize at least the send array. Where a second array is present it is most preferred to optimize both arrays. A preferred optimization process includes sending a plurality of transmissions using different combinations of send elements, while maintaining the same or approximately the same transmission power. The plurality of transmissions sent by the different combinations of send elements using the at least one receive transducer of the receive arrangement are then received and detected at the opposite side of the channel. The system or operator then determines which of the tested combinations of send elements resulted in the strongest received transmission being received at the receive arrangement. "Strongest" may mean, depending on the arrangement, the fastest and/or clearest communication signal, or the signal capable of transmitting the greatest amount of power for generating electricity, or both. Send elements in the combination which resulted in the strongest received transmission are activated and used for sending transmissions. Elements which were not in the most effective subset are deactivated and not used for transmissions, at least until the optimization process is repeated.

A particularly preferred optimization process includes sending a first transmission using a first subset of the send elements in the send array, and detecting the first transmission, or the absence of the first transmission, at the receive arrangement. Next, one (or potentially more than one) additional send element which was not active in the first subset is activated, thereby forming a second subset of send elements. A second transmission is then sent using the second subset of send elements, but preferably the same transmission power as used for the first transmission. The second transmission (or lack thereof) is detected if present at the receive arrangement. If the second transmission resulted in a stronger signal being received at the receive arrangement than the first transmission, the added element is left active. If the second transmission resulted in a weaker signal being received at the receive arrangement than the first transmission, the element is deactivated again. If the signal is the same or substantially the same it may be deactivated or left active depending on the system. Preferably this process is repeated using different elements and determining if they contribute to or hinder the operation of the channel as a whole.

An alternative aspect of the optimization process, which could be used in combination with the above process, involves sending a first transmission using a first set of the send elements in the send array, and detecting the first transmission, or the absence of the first transmission, at the receive arrangement. A test send element (alternatively more than one) which was active in the first set is then deactivated, thereby forming a second subset of send element. A second transmission is then sent using the second subset of send elements, but preferably the same transmission power as used for the first transmission. The second transmission, or the absence of the second transmission, is detected at the receive arrangement. If the second transmission resulted in a stronger signal being received at the receive arrangement than the first transmission, the test send element is left deactivated. If the second transmission resulted in a weaker signal being received at the receive arrangement than the first transmission, the test send element should be reactivated. If the second transmission is similar to the first transmission, the element may be activated or not depending on the preferences of the user.

The system and method are well suited to implementations where the first surface and the second surface of the channel medium are capable of movement relative to each other. When movement is possible or assumed, the optimizing step should be repeated at least periodically, and may be run continuously or nearly so.

In some embodiments the receive arrangement comprises a receive array coupled to the second surface, the receive array including a plurality of receive elements which typically each include a transducer. The send array and the receive array are preferably at least partially opposite each other across the channel medium, at least in the operable state. In some embodiments, "coupled" arrays may only be transiently coupled, such as when surfaces of two vessels are temporally moved near each other for power, signal, and/or data transfer. Typically transmissions sent from the send array are received by the receive array. In some embodiments transmissions are also sent in the opposite direction, either concurrently or alternatingly.

The optimizing step may include measuring and comparing transmission energy from transmissions that is reflected back to the first surface from the second wall, the second surface, and/or the receive arrangement.

The optimizing step may also comprise using an algorithm in which send elements are turned on and off to actively search for a set of send elements which results in the strongest transmission signal being received at the receive arrangement. Such algorithm may be systematic and/or random.

The arrays often comprise elements arranged in a grid pattern on a surface, the grid pattern(s) having a plurality of elements on each side of the grid. The grid pattern is typically a square or a rectangle, but can take other shapes.

The system and methods can be used for acoustical transmission of power through the channel medium. Preferably, for power transfer, the optimizing step includes deactivating send elements at the first surface which are not well aligned with receive arrangement at the second surface in order to avoid transmitting power which will not be received by the receive arrangement. Preferably transmissions are sent through the channel medium using only an optimal subset of the send elements determined by the optimizing process. Acoustic transmissions received at the receive arrangement can be turned into electrical energy using the at least one receive transducer. the power generated by the at least one receive transducer can be used, for example, to power electronics and/or to charge a battery.

In some embodiments each element of the transmit array has its own electrical matching network, and/or also its own in-line switch which is adapted to activate or deactivate each respective send element. The in-line switches may be used to activate and deactivate respective transmit elements of the transmit array.

Instead of or in addition to power transmission, the method and apparatus can be used for acoustical transmission of at least one of data and instructions through the channel medium. For data transmissions the receive arrangement preferably comprises a receive array, the receive array comprising a plurality of receive elements, and the receive elements each comprising a transducer. Preferably the receive array, in addition to the send array, is optimized. The receive array can be optimized by identifying and activating at least a subset of receive elements at the second surface which are sufficiently aligned with send elements on the opposite first surface of the channel medium for effective communication. Data transmissions are sent from the activated send elements and received at the activated receive elements. Transmissions received by the activated receive elements are translated into at least one of data and instructions. Multiple-input multiple-output ("MIMO") processing may be applied to data prior to transmission by the send arrangement. This can be done using a MIMO precoding module which controls individual send elements to create and control the transmissions of data and/or signals by the send elements. A digital to analog converter can be used to convert a digital signal to an analog signal before transmission through the channel medium. An analog to digital converter can convert the transmitted signal to a digital signal after transmission through the channel medium. A MIMO decoding module can be used to decode the signal after transmission through the channel medium.

A particularly interesting application of the present invention is for transmissions between the interiors of two at least partially submerged bodies. These may be moving or movable bodies, and such channels may be temporary since one or both bodies can eventually move well beyond the reach of transducer arrays. At least one of the first wall and the second wall may be a water craft hull. In such cases the channel medium therefore comprises water and at least one, sometimes two, water craft hulls. Typically in submerged arrangements the channel medium comprises a first wall comprising the first surface, a second wall comprising the second surface, and liquid between the first wall and the second wall. In such arrangements, when the walls or water craft are not rigidly connected, some motion between the first wall and the second wall is possible or even inevitable. When the walls and arrays move, it is often desirable to periodically or continually repeat the optimizing step to compensate for any movement.

In one embodiment of the invention a coupled send array and receive array are both comprised of substantially square or substantially rectangular elements arranged in a grid pattern, the grid patterns having a plurality of elements on each side.

In some embodiments, when send elements which have transmission sending faces pointed directly at one or more receive elements, those send elements are activated and used to send transmissions. Conversely, send elements which do not have transmission sending faces pointed at or near a receive element are deactivated and not used to send transmissions. These alignments can change, such as when the arrays move relative to each other.

In an alternative embodiment the send elements in the send array are physically spaced apart from each other, and the spaced apart elements are used to send transmissions to the receive arrangement. When spaced apart send elements are coupled with a receive array, the transmissions generated by the spaced apart send elements will often each excite a plurality of receive elements due to acoustic spreading.

When a receive array is provided, it is preferable to also optimize the receive array. Optimizing the receive array may be achieved by sending transmissions from the send array, measuring an amount of transmitted energy captured at each of a plurality of receive elements in the receive array, and selecting a subset of receive elements that are receiving higher levels of transmitted energy to be activated. The other receive elements, which are receiving lower levels of transmitted energy, are deactivated. A threshold level or dividing line between the elements which are receiving enough transmission energy to remain active and those which are not can be determined for each application. Typically, after optimizing the receive array, transmissions are sent from the send array using only the activated receive elements.

The system and methods can be used advantageously with curved surfaces. Curved arrays can be fixed to curved portions of substrate to form the channel.

In another aspect of the invention, a method of optimizing and using an acoustic-electric channel including piezoelectric transducer arrays includes providing a channel medium for passing acoustical transmissions, the channel medium comprising a first surface and a second surface, the channel medium being capable of transmitting acoustical energy there through. A first arrangement is coupled to the first surface and a second arrangement coupled to the second surface, and the first and second arrangements are positioned at least partially on opposite sides of the same region of the channel medium.

The first arrangement comprises a first array coupled to the first surface, the first array comprising a plurality of first array elements, each first array element comprising a transducer, and each first array element can be controlled independently of other elements in the first array. A second arrangement comprises a second array coupled to the second surface, the second array comprising a plurality of second array elements, each second array element comprising a transducer, wherein each second array element can detect received transmissions independently of transmission detection at other second array elements.

The acoustic-electric channel can be optimized using a sounding process. The optimizing step includes individually exciting each first element of the first array one at a time to send a transmission through the channel medium, while simultaneously monitoring the received transmission or absence of received transmissions at each second element, thereby mapping which first elements effectively send transmissions to each of the second elements. The optimizing step further comprises activating first elements which are capable of sending effective transmissions to at least a threshold number of second elements (the threshold number may be 1, 2, 3, 4, or more), and deactivating the remaining first elements. After the optimizing step, transmissions are sent from the first arrangement using only the activated first elements.

Another aspect of the invention are methods of designing and constructing dual transducer array acoustic-electric channels, and channels build using those techniques and principles. These methods and channels can be use to particular advantage with moving surfaces.

A preferred method for designing and constructing an acoustic-electric channel with moving elements begins with determining the performance requirements for the acoustic-electric channel. These requirements are used to determine a theoretical minimum transducer footprint required for a first array of the acoustic-electric channel if the first and second surfaces are stationary. Two dimensions $L_{min1}$ and $L_{min2}$ are selected for a transducer array having at least the determined minimum footprint. The preferred dimensions and orientation (e.g., 3×4, 2×6, and 1×12 all achieve the same total footprint) of the array can be chosen based on a variety of factors, such as the surface available to hold the array(s). It is also desirable to determine or estimate the maximum expected alignment errors $\epsilon_{max1}$ and $\epsilon_{max2}$ in each of (at least) two dimensions. The alignment errors corresponding to the maximum expected relative movement of first surface and second surface in each dimension. These quantities are used to design and construct a first array having a first dimension of not less than $L_{min1}+\epsilon_{max1}$, and a second dimension of not less than $L_{min2}+\epsilon_{max2}$. Preferably each dimension of the first array includes a plurality of first array elements, each element comprising a transducer. The first array is coupled with the first surface of the channel medium, and a second array is provided on the second surface of the channel medium which, at least in an operable state, when the channel is set for use, is at least partially opposite the first array.

A second array can be designed and constructed using a similar method to the first array. A theoretical minimum transducer footprint is determined for the second array of the acoustic-electric channel for the arrangement to achieve the previously-determined performance requirements if the first and second surfaces are stationary. Two dimensions $L_{min3}$ and $L_{min4}$ are then selected for a second transducer array having at least the minimum footprint. In preferred embodiments the dimensions will be the same as or similar to the dimensions of the first array it will be paired with. The second array is fabricated or provided having a first dimension of not less than $L_{min3}+\epsilon_{max1}$, and a second dimension of not less than $L_{min4}+\epsilon_{max2}$. Typically each dimension of the second array includes a plurality of second array elements, each element comprising a transducer. The second array is fixed to the second surface of the channel medium in a position which, in an operable state, is at least partially opposite the first array.

It will be understood that it is generally desirable to align opposing transducers and arrays as closely as possible. The invention provides methods of compensating for imperfectly aligned and/or moving transducers and arrays. Transducers and arrays are referred to as "at least partially aligned" to reflect the fact that they will be aligned as best possible, but that alignment will nevertheless often be imperfect or only partial.

Another aspect of the invention includes optimizing at least a first array, and preferably also a second array, using an optimization process comprising sending a plurality of transmissions using different combinations of first array elements, and detecting the plurality of transmissions sent by the different combinations of first array elements using the second array. It is then determined, automatically by a module or by an operator, which of the tested combinations of first array elements resulted in the strongest received transmission being received at the second array. Typically then the first array elements in the combination which resulted in the strongest received transmission at the second array are activated. The remaining first array elements are deactivated. Transmissions are then sent using only the activated elements of the first array. This optimization process can be used with acoustic-electric channels between moving surfaces. Preferably the optimizing process is repeated for one or, if applicable, both arrays either periodically or continuously to compensate for any relative movement of the first array and second array.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a simple acoustic-electric channel including a single pair of piezoelectric transducers;

FIGS. 2a, 2b and 2c illustrate different alignment cases for a simple acoustic-electric channel including an acoustic beam;

FIGS. 4a and 4b are respectively a standard disc-shaped piezoelectric transducer, and a transducer array excitation pattern mimicking the single disc transducer

DESCRIPTION OF THE PREFERRED EMBODIMENTS

Figures 3A, 3B:
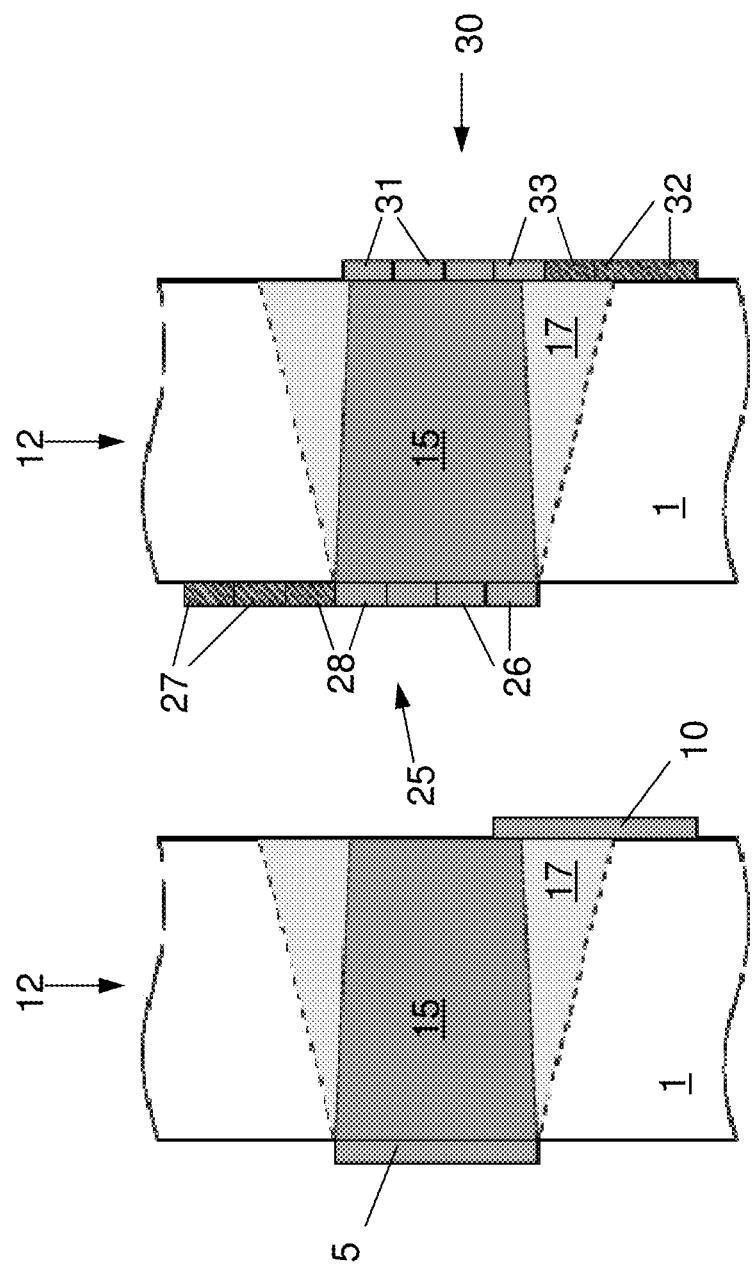
FIGS. 3a and 3b illustrate acoustic-electric channels showing the advantages of arrays in compensating for misalignments.

Referring now to the drawings, in which like reference numerals are used to refer to the same or similar elements, FIG. 1 shows an example of a simple piezoelectric-based acoustic-electric channel 12. A transmit transducer 5 and a receive transducer are axially aligned on opposite sides of a transmission wall 1. The pair of transducers 5,10 and the area of the wall between them 10, form the channel 12. In this example the transmit 5 and receive 10 transducers are circular "disk" transducers whose axes are coaxially aligned. Ideally, the transmit and receive transducer or transducers 5,10 are perfectly aligned across the wall although, as mentioned, such will not always be the case.

FIGS. 2a-2c illustrate three generalized alignment cases for a single pair of transducers, including a simplified representation of a hypothetical signal beam 15,17. Note that the diagrams show some spreading 17 of the acoustic energy beam 15 as the distance from the transmit transducer 5 increases. In FIG. 2a, the transducers are perfectly aligned and the receive transducer captures the maximum amount of the transmitted energy. FIG. 2b shows a partially aligned channel 12, where the receive transducer captures only a fraction of the transmitted energy. This situation would result in a loss of power transfer efficiency and/or potential communications performance loss, such as higher error rates or reduced data rates. The third case, FIG. 2c, shows the receive transducer 10 completely misaligned with the transmit transducer 5, resulting in a severely degraded or non-functional channel.

Dual Transducer Array Acoustic-Electric Channels

FIG. 3a schematically shows a pair of single, large, misaligned transducers 5,10. In contrast, FIG. 3b shows a preferred method and arrangement for alleviating problems associated with transducer misalignment in acoustic-electric channels involves using transducer arrays 25,30 in place of single transducers 5,10. Transducer arrays include a plurality of much smaller individual piezoelectric transducers, also called array "elements" 26,27,28,31,32,33. Element 28 in the figures refers to send elements generically, whether activated or not. Element 33 refers to receive elements generically, whether activated or not. Elements 26 and 31 are active send and receive elements, respectively, while elements 27 and 32 are deactivated send and receive elements, respectively.

The total area covered by the transducer arrays is typically larger than the footprint, or total transducer area, than would be required for equivalent single, perfectly aligned transducers. In other words, the total minimum transducer footprint required to achieve a given set of operational characteristics will generally be greater using transducer arrays 25,30 (allowing for some misalignment) than for a single pair of (perfectly aligned) transducers 5,10. This is because the arrays 25,30 will often include elements 27,32 which are deactivated and unused, or activated but not operating efficiently, as shown schematically in FIGS. 3a and 3b. FIGS. 2a, 3a, and 3b illustrate the general concept. While the perfectly aligned large transducers in FIG. 2a capture the full signal 15 with a smaller footprint, much of the signal is lost if, as in FIG. 3a, the larger transducers 5,10 are not fully aligned. Using the arrays 25,30 of the invention, however, all or nearly all of the signal 15 is captured even if the arrays are not fully aligned, as shown in FIG. 3b. Although the arrays 25,30 have a larger total footprint than the single large transducers 5,10, they have a substantial advantage over a single transducer of the same size because elements 27,32, which are less useful because of misalignment, can be deactivated to save power and/or improve efficiency.

Systems using enlarged array footprints allow for a certain amount of array misalignment by making it possible to select subsets 26,31 of the transducer arrays on each side of the channel 12 that collectively produce an operational footprint which meets minimal needs. FIGS. 3a and 3b illustrate the concept. In FIG. 3a, conventional transducers 5,10 are misaligned, resulting in poor coupling between them, as the acoustic beam 15 mostly misses the receive transducer. In FIG. 3b, the single transducers are replaced by larger transducer arrays 25,30. In both FIGS. 3a and 3b, the misalignment (vertical translation) between the two transducers and two arrays is equal. It is obvious that in case 3a, the channel 12 would be severely inhibited by the misalignment. In contrast, using transducer arrays (case 3b), the desired channel may be virtually constructed using a subset of the much smaller transducer array elements 26,31.

Note that in FIG. 3b the receive array (right 30) includes piezoelectric elements 32 being excited only by the periphery 17 of the beam, which has less energy, or not being excited at all. In the example shown, these elements 32 are considered deactivated, although these may become useful to the system and could be activated, depending on the desired operation and position of the arrays. For example, the relative alignment of the arrays 25,30 could shift so that the unused elements 32 are positioned to receive the core 15 of the acoustic beam and, thus, can be reactivated. Alternatively or in addition, the method of operation of the system could be varied such that it becomes desirable to activate and use elements which only receive the periphery 17 of the signal beam.

In some embodiments receiver elements which only receive a partial, weak, or peripheral signal 17 will remain active, and in other embodiments they will be deactivated. In one preferred embodiment elements receiving signals below a certain threshold strength are deactivated.

Transfer arrays including a plurality of smaller array elements 28,33, which can be individually operated, are not equivalent to individual larger transducers 5,10, which can only be operated in an all-or-nothing fashion. Methods which selectively use subsets 26,31 of transducer arrays are often superior to methods using larger single transducers 5,10. In particular, activating only those transmit array elements 26 that align with receive transducers increases power transfer efficiency by avoiding sending power that will not be received. It can also be possible to reduce communication crosstalk by deactivating send array elements 27 which are not well aligned with receive elements. Persons of skill in the art will appreciate that this description of use of one-dimensional dual-sided transducer arrays may be easily extrapolated to use in a two-dimensional implementations (two-dimensional transducer arrays, see FIG. 4b), for arrays which are bent or curved, and for arrays using different shapes, numbers, and arrangements of transducer array elements for different applications.

The typical construction of a transducer array 25,30 will include a square or rectangular arrangement of piezoelectric elements. Each piezoelectric element will normally be smaller than the transducers in one-to-one transducer implementations, such as in FIG. 1. Individual elements may take a variety of shapes, although square or rectangular elements are preferred. For example, elements may take the form of small round piezoelectric disk transducers, although this would result in "dead" spaces between the disks, or any other feasible element geometry.

By selecting multiple adjacent elements and exciting them equally, a congregate piezoelectric excitation (FIG. 4b) can be created which simulates or resembles that of a single, large transducer (FIG. 4a). FIG. 4b is also a non-limiting example of a two dimensional transducer array 25 where some elements are activated 26 and others are deactivated 27. Similar arrangements could be used for receiver arrays.

Alternatively, elements could be controlled individually and independently. This allows for more complex signals, and potentially greater transfer rates, than methods where all the elements in a single large area are excited (or not) as a group.

The preferred size of the transducer arrays depends at least in part on the maximum expected alignment error between a given pair of arrays. For example, in a one-dimensional array design, if the minimum working footprint required for effective use of the system is specified as $L_{min}$ and the maximum expected alignment error is $\epsilon_{max}$, then each transducer array should be of at least length $L_{min}+\epsilon_{max}$ to ensure the functional array overlap will be acceptable. This relationship can be generalized to a second dimension, such as for square and rectangular arrays, where the second dimension of the transducer array should be of at least length $L_{min}+\epsilon_{max}$ where the minimum footprint in the second dimension and the maximum expected alignment error in the second dimension are respectively substituted. The determined preferred or minimum sizes in each dimension can be used to determine the number and size of transducer elements to arrange in each dimension. In one preferred application, calculated array dimensions and known transducer element dimensions are used to determine how many transducer elements should be included in the X and Y axes of a grid-like transducer array. Persons of skill in the art can extrapolate this principle to various two dimensional arrays, and also to arrays of shapes which are not squares or rectangles.

Arrays with varying numbers and arrangements of elements can be used with this invention. A single row of transducer elements could be arranged in a single file line to form a "one dimensional" array, although such an array will not, of course, actually be one dimensional. Such a linear array could consist of at least 3, 4, 5, 7, 8, 10, 20, 50, 100 or more elements, including all intermediate numbers and sub-ranges. Often arrays will be "two dimensional" in the sense that they have at least two (typically more) elements in each dimension and have a generally planar arrangement, as shown for example at FIG. 4b. Such an arrangement may still have depth in a third dimension such as, for example, a generally planar array which conforms to a curved surface. Two dimensional planar arrays will often be provided in a grid-like patterns as in FIG. 4b. Preferred arrangement may have n rows and m columns where n and m may be the same or different and are preferably 2, 4, 5, 8, 10, 15, 20, 40, 60, 100, 400, or more elements in each dimension, including all possible combinations, and all intermediate numbers and sub-ranges. There is no maximum value for the number of elements.

It should be understood that in some embodiments, elements which are "deactivated" do not send transmissions at all, while "activated" elements may be turned on an off to control and create a signal. These elements, which may be perfectly aligned for communication with opposite transducers, may still be considered "activated" for the purposes of optimization despite, in some embodiments, being selectively deactivated as part of signal communication.

Single Transducer Array Acoustic-Electric Channels

An effective transducer array may be provided on only one side of a channel: i.e., only on the transmit side or only on the receive side. A single (or potentially multiple) large transducer can be paired on the other side of the barrier or channel. An advantage of this hybrid approach is that the increase in complexity and footprint size associated with using a transducer array, and the need to select a subset of that array at any given moment, is restricted to one side only. This may be advantageous in applications where complexity and footprint size must be minimized on one side of the channel.

In the hybrid single array arrangement, alignment problems are addressed in the same manner described above with regard to double array systems, but are only compensated for by the system on one side of the barrier. The drawback of this approach is that the single array must be larger because that it must accommodate all of the alignment uncertainty. Specifically, the single array must compensate for twice the alignment error that each side must accommodate when both sides use arrays and participate in compensation. For a one-dimensional array, this requires that the minimum array length in each dimension be $L_{min}+2\epsilon_{max}$.

Sparse Transducer Arrays

Referring again to FIGS. 3a and 3b, the full send transducer array 25 is not necessary in some applications because the signal generated by a single transmit element 26 may simultaneously excite several receive elements 31 due to acoustic beam spreading 17. Applying this principle, it is sometimes possible to sparsely populate one or both arrays and still achieve successful communication and/or power transmission. Methods and arrangements where array elements are physically spaced apart, and where an array is closely packed but only a fraction of the array elements are actually implemented, are both contemplated. This approach is equally applicable to both single and dual transducer array channels, and may be beneficial in cases where cost is an issue (reducing the total hardware required), to conserve power, and/or where the electronics attached to the array are limited.

Sparsely populated arrays may be undesirable in applications where acoustic beam 15 spreading 17 (see FIGS. 2a-2c) is minimal because a transmit element 26 may align perfectly with a void in the receive array—between receive elements 31—causing little-to-no excitation of any receive array elements.

Adaptive Element Activation and Deactivation

In arrangements where transducer arrays are used, it will often be necessary to determine which subset of elements of each array should be active to produce the desired channel. Typically for any given installation, or at any given time for movable arrangements, some elements in each array will be active 26,31 while others will be inactive or unused 27,32. Selecting elements to be active and inactive is an important advantage of this invention over the prior art, particularly over pairs of larger transducers which can only be controlled in an all-or-nothing fashion.

When the alignment between the sides of a channel is time varying, the selection of elements must be adaptive in order to track the movement to maintain channel quality. When only the receive side uses an array 30 and power is being delivered through the channel 12, the receiver can simply determine the amount of power captured by each element, and select the subset of elements that are receiving the highest power levels to remain active. Where an array is used at the transmitter, a preferred approach is to use feedback from the receiver to guide the adaptation. For instance, an additional transmit element could be activated while maintaining the same total transmit power, and the receiver could send information back to the transmitter indicating whether the receive power level increased, decreased, or was unchanged. If the received power level increases, the newly activated element can stay active; otherwise, the element can be turned back off. Likewise, an active element could be deactivated while, again, keeping the total transmit power constant. Feedback can be sent back from the receiver indicating whether that increases or decreases the total delivered power. A decrease in received power would indicate that the element should be reactivated.

A simple algorithm in which elements are systematically or randomly turned on or off to actively search for the best set of elements to keep active and track changes in the alignment can be implemented with this system. An optimization algorithm could be run only once when an arrangement is first installed, periodically, or continuously. Where the send and receive arrangements are expected to move relative to each other it will usually be desirable to continue optimization either continuously or periodically, depending on the frequency and degree of movement.

Receiving feedback from receiver to transmitter requires a communications channel, which may be the same acoustic channel being optimized, or may be a different communication means. When using the channel being optimized, the preferred bandwidth of the feedback channel will depend on the number of elements in the array, the particular algorithm used, and the rate at which the adaptation must take place.

An alternative or additional approach to determining which subset of transmit elements to use is by measuring reflected power that is returned to the amplifier that drives each send transducer. The usefulness of this technique will depend on the nature of the channel 1,12 and, in particular, whether or not different fractions of the power transmitted by an element 26 in the transmit array are reflected back to the transmitter when the transmission does and does not reach a receive transducer element 31. If the reflections are different when receive elements are or are not carried this technique may be effective. If the reflections are the same or similar, the reflection technique is not likely to be useful. Where the reflections are different, the reflected power (or lack thereof) could be a useful indicator of whether a given transmit transducer is delivering power to the receiver or not, and, in turn, whether each transmit element should remain active. In a preferred method, transmit elements which send power which is received, or where at least a certain threshold fraction or amount of power is received, remain active. Conversely, send elements emitting power which is not received at all or which is not sufficiently received are deactivated. An advantage of the reflection approach is that it does not require a feedback communication channel for information from the receiver since the receiver is not actively involved in the adaptation of the transmitter array.

Other algorithms for adaptively selecting transmit and/or receive array elements can also be used.

It will be generally understood that it is desirable to align opposing transducers and arrays as accurately as possible. The invention provides methods of compensating for imperfectly aligned and/or moving transducers and arrays. Transducers and arrays are referred to as "at least partially aligned" to reflect the fact that they will be aligned as best is reasonably or economically possible, and that some alignment is usually necessary for a channel to function, but that alignment will nevertheless often be imperfect or only partial.

PREFERRED APPLICATIONS

Power Transmission

A preferred application of acoustic-electric channels is in transmitting power through a barrier without penetrations. This application is particularly dependent on accurate transducer alignment in one-to-one channels, and even slight misalignments can drastically reduce power transfer efficiency. As a result, the instant adaptive power transmission system, which makes use of transducer arrays to compensate for misalignment to maximize the power transfer efficiency and/or the amount of delivered power, is highly desirable.

A particularly complex application would be use to transmit power through the wall of a first submerged pressure vessel (e.g., a submarine or boat hull), across a water layer, and through a second submerged pressure vessel (e.g., a robotic submersible). In such an application the two vessels, despite best efforts to hold them relatively still during power transmission, may still have some relative movement. In such an arrangement, transmission of power between standard transmit and receive transducers in one (or more) one-to-one channels will often be sub-optimal at best, and the connection may be transient. These obstacles may be partially or completely compensated for using the adaptable arrays, and methods of selectively activating and deactivating transducer elements, of the present invention.

Figure 5:
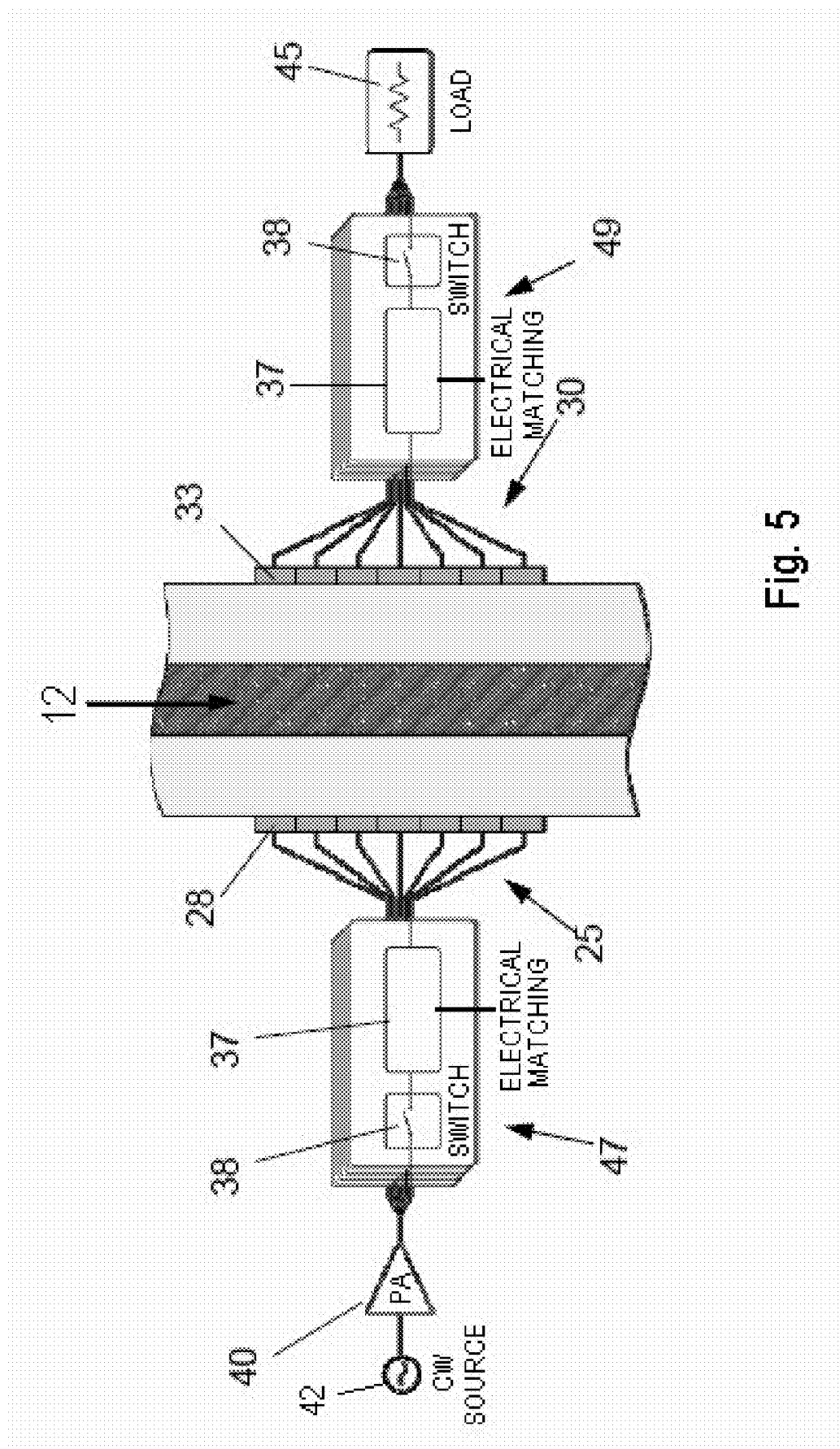
FIG. 5 is a schematic diagram of an adaptive power transmission system using transducer arrays.

FIG. 5 shows a preferred schematic arrangement for using transducer arrays to transmit power. Each element 28,33 (transmit and receive) has an individually connected electrical matching network 37 intended to minimize losses, as well as an in-line switch 38, which may be mechanical or electrical, which in a most preferred embodiment allows each transducer element to be individually added or removed from the set of active elements 26,31.

The switches in the embodiment of FIG. 5 may be dynamically controlled, such as to compensate for movement, using a feedback loop as described above. These feedback controls may be a full loop return, where data is passed back through the wall 1 to the transmission source, or alternatively isolated to each side of the wall where the transmit 47 and receive 49 electronics will optimize themselves individually. Full loop return may be implemented using a reflection based technique, or via a dedicated data return channel, among other possibilities. See Shoudy, D. A., Saulnier, G. J., Scarton, H. A., Das, P. K., Roa-Prada, S., Ashdown, J. D., and Gavens, A. J., 2007, "An Ultrasonic Through-Wall Communication System with Power Harvesting," In Proc. IEEE Ultrasonics Symposium, pp 1848-1853 for an example of a preferred reflection based optimization method.

In arrangements where relative movement between the send and receive walls not expected, the positions of the transducers are typically fixed once coupling of the arrays 25,30 to the substrate 1 is achieved. Is those cases the switches 38 in FIG. 5 may be set, and permanently or semi-permanently maintained, after an initial channel "sounding" to determine which transmit and receive elements to activate. The switch settings will in theory only need to be adjusted if and when the channel 12 changes, such as if the arrangements are moved.

Figure 6:
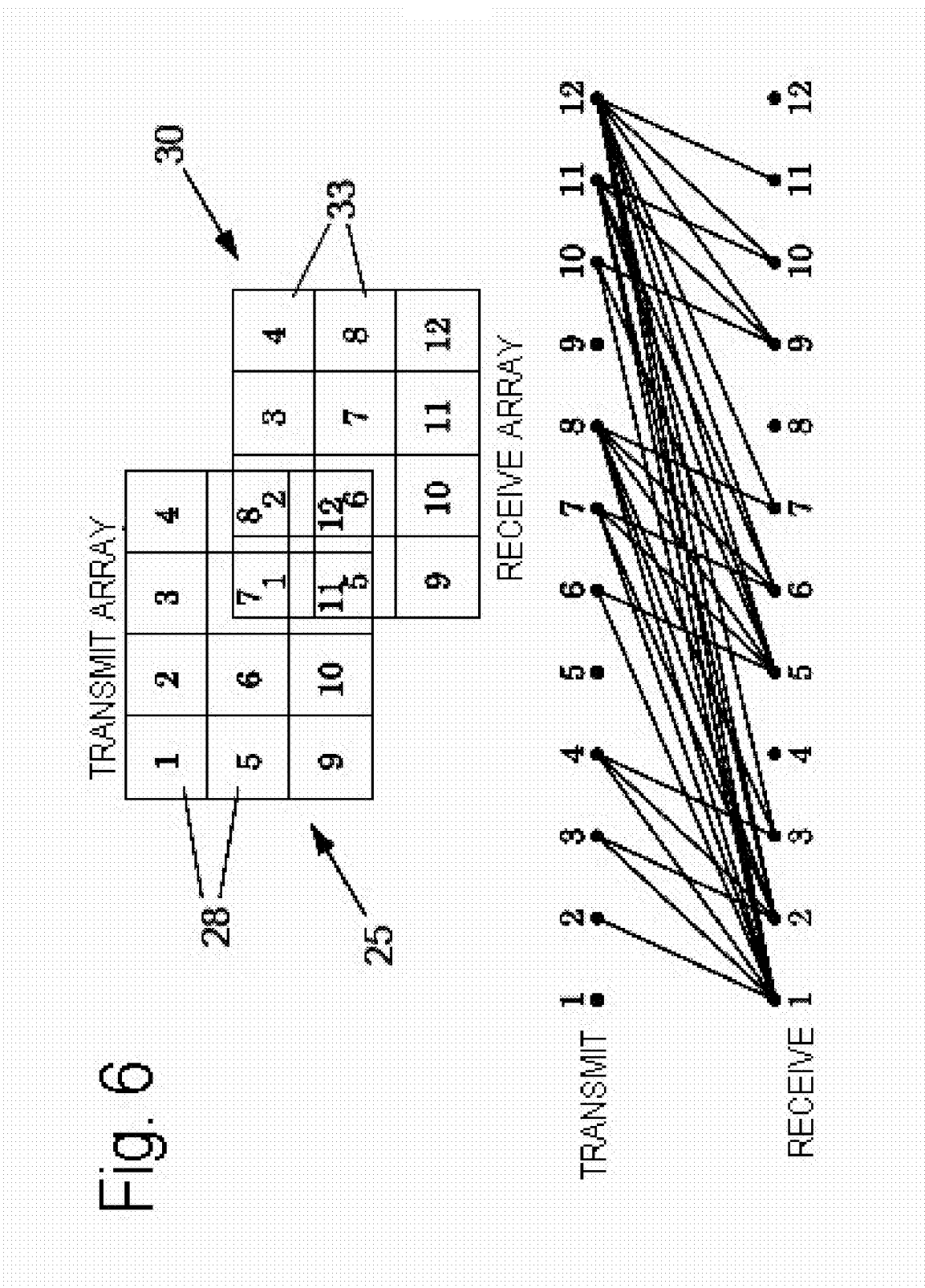
FIG. 6 is a composite representation of two partially misaligned 3 element×4 element transducer arrays, and an example line-based element association map for the elements in the arrays.

One method for sounding of the channel 12 is to individually excite each element 28 of the transmit array, one-by-one, while simultaneously monitoring the received signal magnitude on each receive element 33. This sounding method results in an element association map, an example of which is given in FIG. 6. In this example the send 25 and receive 30 transducer arrays are partially offset and each composed of four elements 28,33 horizontally and three elements vertically, and the transmit elements are assumed to be capable of exciting multiple receive elements due to acoustic energy spreading 17. Given the association map in FIG. 6, it is obvious that some of the transmit elements are incapable of exciting any receive elements to a substantial degree (transmit elements 1, 5, and 9), and others excite only a few receive elements (transmit elements 2, 3, and 6). These transmit elements would typically be removed from operation as they would contribute significantly to losses in power transmission. Considering the opposite side, receive elements 4, 7, 8, and 10-12 may not contribute significantly to power reception, and hence may also be removed from the receive circuitry. However, if the receive circuitry is designed accordingly, it may be possible to properly isolate each receive element such that they all remain active without contributing to losses due to power coupling between receive elements.

Data Communication

Transducer channels can also be used to communicate data, sometimes concurrently with power transmission. The above discussion of problems and solutions associated with power transmission also generally applies to data communication. In power transmission, however, minimization of the power losses (maximized transfer efficiencies) is normally the primary design criteria. In data transmission, although a reasonable power transfer efficiency is preferred to provide proper signal reception, maximization of the transfer efficiency is not normally necessary because the signal only needs to be detected, and not turned into electricity sufficient to power other devices. Given this, having inefficient transmit and receive elements active in the system is much less detrimental to communication applications. It follows that the elements which would be deactivated for power transmission may not be deactivated in data transmission. For example, referring to FIG. 6, marginally effective transmit elements 2, 3, and 6, and receive elements 7, 10, and 11, may be left active in communication systems even though these elements may only provide a very small increase in data rates, and even though they would be deactivated in many power transmission applications. The optimizing step may comprise activating first/send elements which are capable of sending effective transmissions to at least a threshold number of second elements, and deactivating the remaining elements. The threshold number may be 1, 2, 3, 4, or another number, depending on the requirements of the embodiment.

It should be noted that mapping transmit element signals to corresponding receive elements is not necessary in certain MIMO communication techniques, and that the number of transducer elements on the transmit and receive sides of the barrier do not always need to be equal.

Figure 7:
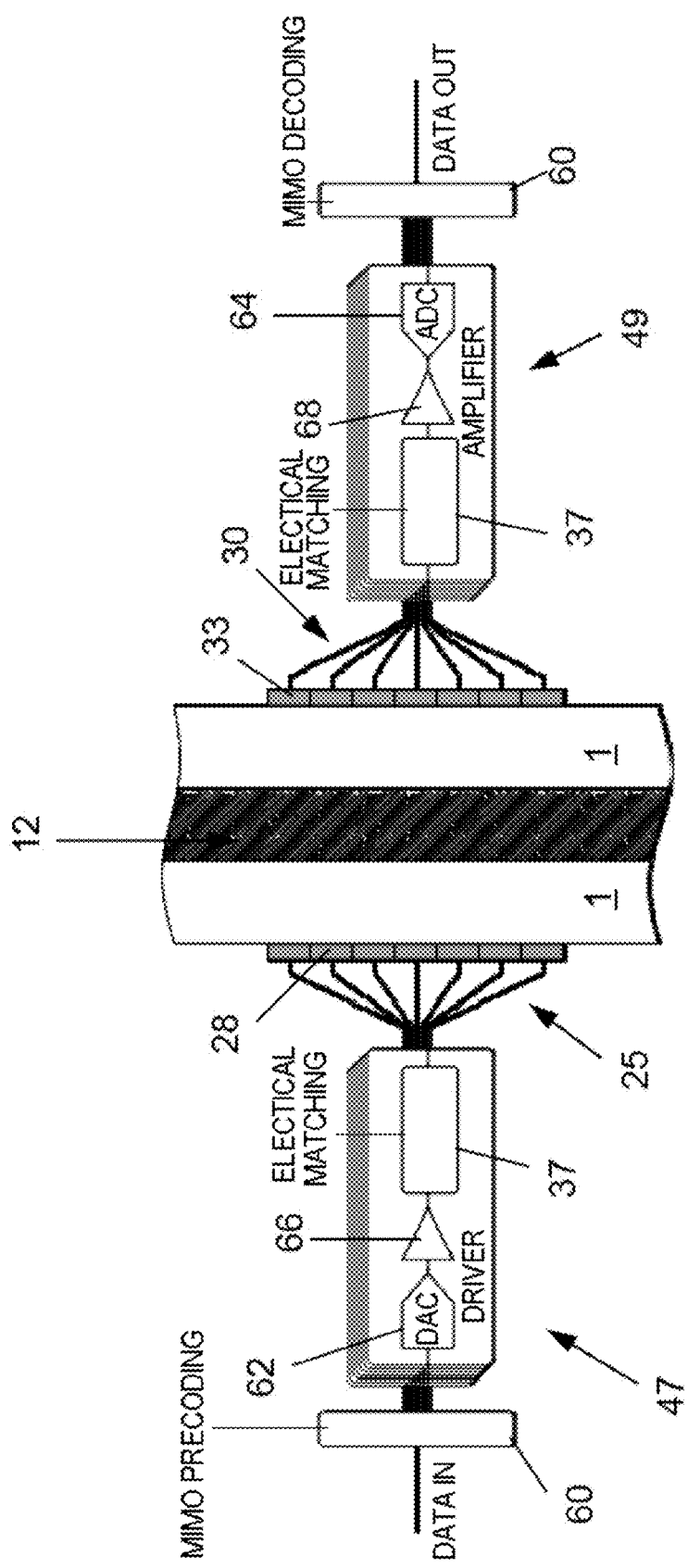
FIG. 7 is a schematic diagram of an adaptive data transmission system using transducer arrays.

FIG. 7 shows an alternative preferred schematic arrangement for using transducer arrays which is particularly suited to transmitting data. This arrangement includes MIMO processing electronics 60. MIMO processing is preferably applied to the data prior to data transmission by transducers 28, and also after data signals are received by each receiver element 33 and transmitted to respective receiver electronics 49. The individual element electronics again provide electrical matching of the elements, though the switches in FIG. 5 are replaced with an digital-to-analog converter 62 and a transducer driver 66 for the transmit elements 28, and a low-noise amplifier 68 and analog-to-digital converter 64 for the receive elements 33. The activation or deactivation of individual elements to create and control the communication signals is accomplished within a MIMO precoding module 60. The data blocks received at the receiving side of the channel are then decoded using corresponding algorithms and circuitry.

Various methods and arrangements for implementing MIMO communication systems using fixed (non-moving) transducer arrays have been previously described. Persons of skill in the art will be able to adapt these and other teachings to the dynamic transducer arrays described herein, such as by using a variety of feedback and feed forward methods. See J. D. Ashdown references supra for examples of MIMO implementations.

Curved and Non-Planar Arrays

Thus far, transducer arrays have been described as either one-dimensional and linear, or Cartesian two-dimensional arrays of piezoelectric transducer elements. Transducer arrays of the present invention are not, however, limited to flat or straight linear geometry.

Figure 8:
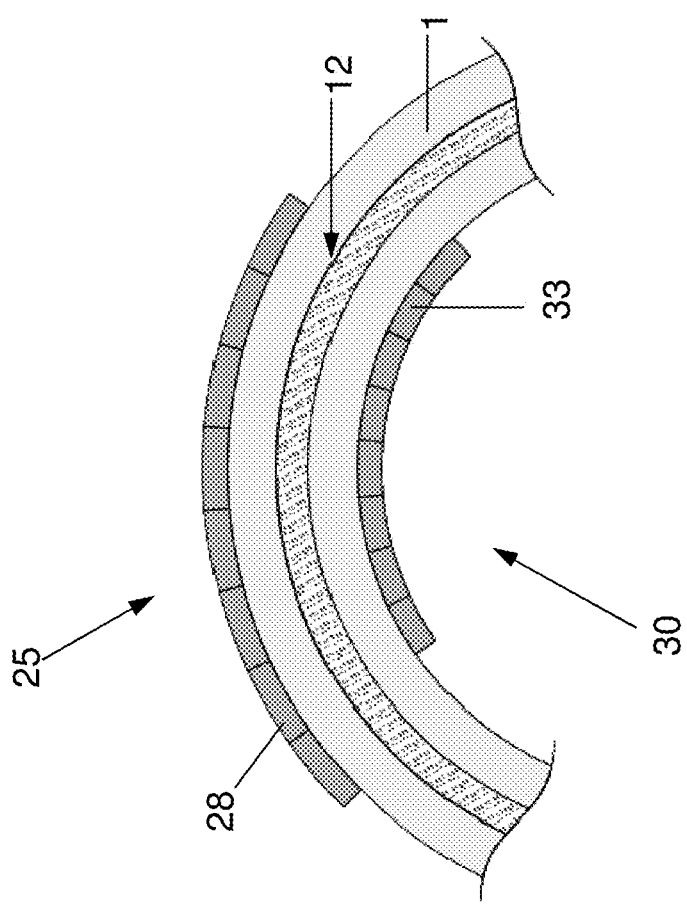
FIG. 8 shows send and receive transducer arrays on opposite sides of a curved three-layer barrier, the arrays being partially misaligned.

A simple alternative case to consider is a channel constructed using inner and outer sides of curved surfaces as shown in FIG. 8. In this example the arrays 25,30 still maintain a two-dimensional format, but the coordinates are cylindrical (constant radius in this example) instead of Cartesian. In FIG. 8, the geometry of the curved barrier 1 creates a cylindrical geometry, and as a result the send transducer array 25 may completely envelop the angular span of the receiver array 30. The curved concentric arrangement can sometimes point transducers which would be misaligned in a straight arrangement towards a transducer on the opposite side of the barrier 1. Send and receive transducers which face at different angles may still be useful for transmission when the curve of the substrate surface nevertheless points the send transducer 28 in the direction of at least one opposing receive transducer 33. Misalignments, especially axial misalignments, can still cause problems and prevent some elements from being useful, however. Techniques discussed above for selectively activating and deactivating elements are also applicable for non-planar and curved arrangements.

The principles on the instant invention can also be applied to even more complex geometries, such as non-planar, non-cylindrical surfaces. To achieve optimal operation, however, persons of skill in the art will need to tailor the array designs to ensure proper energy focusing towards the receive array.

Figure 9:
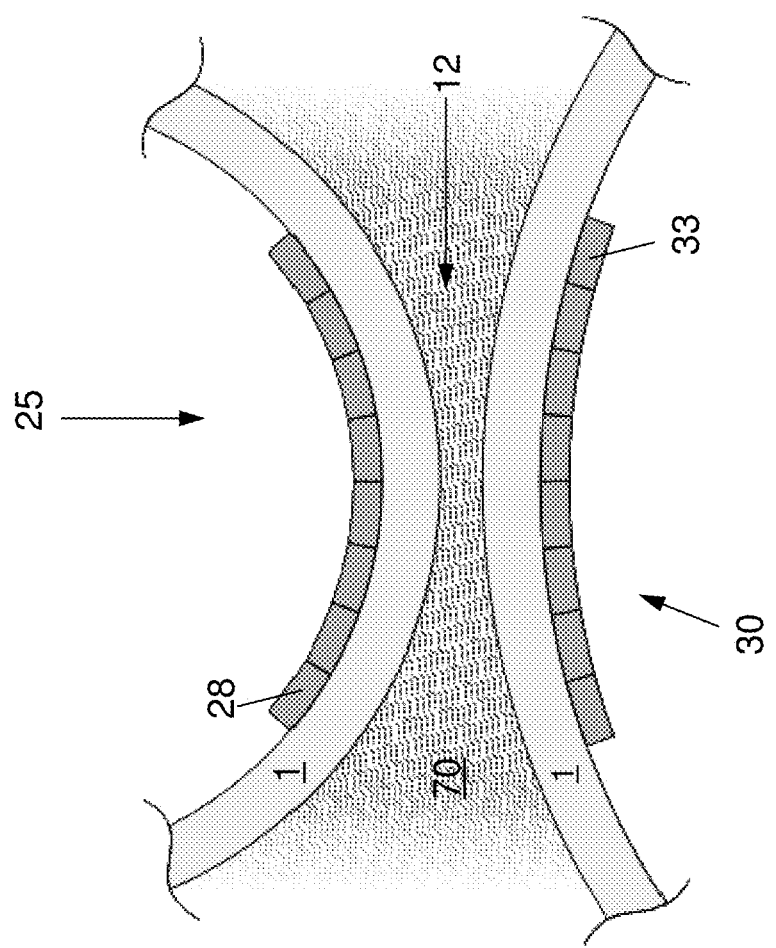
FIG. 9 shows a pair of transducer arrays, each positioned on the inside of a curved, submerged barrier.

A generic, schematic illustration of a more complex design is presented in FIG. 9. In the case of FIG. 9 the transducer arrays are mounted within two different cylindrical enclosures, with both enclosures submerged and in close proximity. Thus, the channel 12 will include the transducers, two different cylindrical enclosures, and a (preferably small) amount of liquid or water 70 between the enclosures. Arrangements along these lines can be employed, for example, for sending power and signals between water craft with curved hulls. The two arrays 25,30 are curved but not concentric, which can cause elements 28,33 which are opposite each other to nevertheless point away from each other. This, it will be understood, must be taken into account when designing such systems, and less curved surfaces (such as flatter portions of a hull) could be selected in some applications to reduce the problem. The adaptive features of this invention are particularly useful for achieving and maintaining efficient transmission across channels such as shown at FIG. 9.

An advantage of using arrays of the present invention is that generally curved arrays can be achieved using a plurality of small transducer elements that, individually, may be either rigid or flexible.

Mixed Resonance Arrays

In cases where both power and data transmission are desired, it is often preferred that the piezoelectric resonances for each application to be staggered. See T. J. Lawry references supra. For example, the power transducer elements may have a nominal 1 MHZ resonance, while the data transducer elements may have a nominal 4 MHZ resonance. Using different resonances makes it possible to have multiple effective channels through a single substrate 1.

Stacked Arrays

Figure 10:
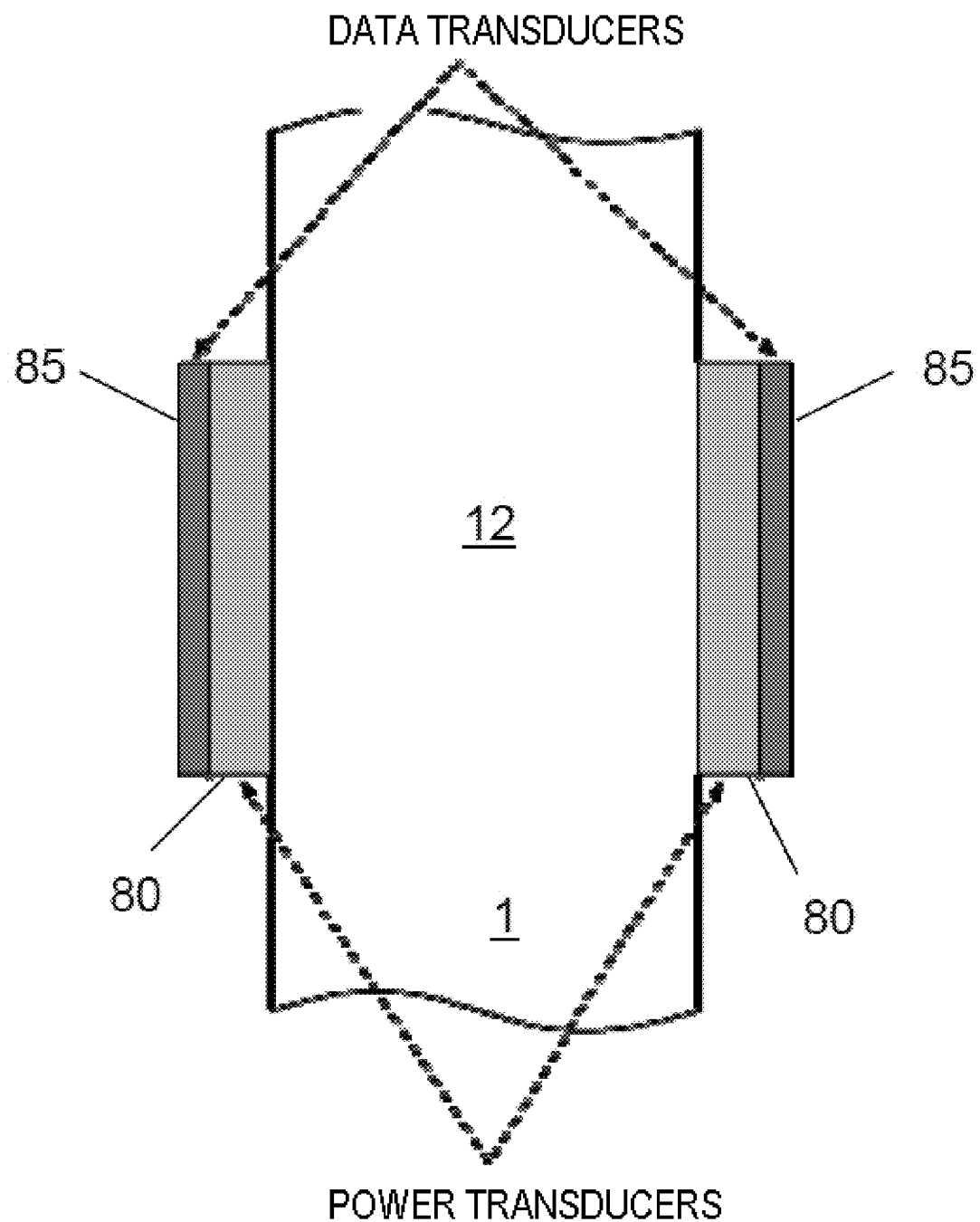
FIG. 10 illustrates overlapping power and data transducers on each opposite side of a barrier.

It is sometimes acceptable to construct two separate transducer array systems to provide the power link and data link independently. See FIG. 10. Where space is a limitation, however, it is also possible to implement power 80 and data 85 arrays that either partially or completely overlap on one or both sides of the barrier 1, as shown in FIG. 10. This may be accomplished by constructing array elements which each have multiple transducers. For example, a single element might have a power transducer and a data transducer, or multiple data transducers. The stacked transducers can be used with multiple different resonances, as mentioned above. The stacking concept may be applied to full arrays, or alternatively to a par or two single transducers.

Bidirectional Transmission

The invention is not limited to systems where all transmit arrays are on one side of the barrier, while all receive arrays segregated on the opposite side of the barrier or channel. Embodiments where both send and receive transducers and/or arrays are on both sides of the barrier, and where the same arrays and transducers play both roles, are also contemplated and known in the art. Having data send arrays on both sides of the barrier allows for data and/or power to be transmitted in opposite directions simultaneously. Bidirectional transmission will have more applications for transmitting data than power, however, since it will rarely be desirable to transmit power in both directions.

"Send" and "receive" arrays, elements, and transducers have been described for simplicity, and to help illustrate the principles of the invention. These terms should not be construed as limiting the invention, however. In some embodiments the same arrays, elements, and transducers can serve both send and receive roles. Using the same piezoelectric transducer for both send and receive functions is generally known in the art. In some embodiments a single transducer or array can be used to simultaneously send both power and data, such as by varying a constant power stream and/or by layering data signals on a constant power stream.

Summary

This invention has several aspects. The invention is conceived of as a set of arrangements for acoustic-electric communication and power transfer between different types and shapes of surfaces, through water, and between vessels or other submerged surfaces. The invention also includes methods of operating transducer array arrangements, methods of optimizing and calibrating transducer array arrangements, and methods of designing and constructing array arrangements. The invention features methods of optimizing transducer arrays both at setup and on an ongoing basis, and to compensate for both initial misalignments and ongoing motion. These methods and apparatus can be used individually, or in various combinations, within the scope of the invention.

While a specific embodiments of the invention have been shown and described in detail to illustrate the application of the principles of the invention, it will be understood that the invention may be embodied otherwise without departing from such principles.

What is claimed is:

1. A method of acoustical transmission of at least one of power, instructions, and data through an acoustic-electric channel using piezoelectric transducer arrays, the method comprising:
   providing a channel medium for passing acoustical transmissions, the channel medium comprising a first surface and a second surface, the channel medium being capable of transmitting acoustical energy there through;
   providing a send arrangement coupled to the first surface and a receive arrangement coupled to the second surface, and wherein the send and receive arrangements are positioned at least partially on opposite sides of the same region of the channel medium;
   wherein the send arrangement comprises a send array which is coupled to the first surface;
   wherein the send array comprises a plurality of send elements, and wherein each send element comprises a transducer and can be controlled independently of other send elements in the same array;
   wherein the receive arrangement comprises at least one receive transducer which may optionally be an element within a receive array;
   optimizing at least the send array, wherein the optimization process comprises:
   sending a plurality of transmissions using different combinations of send elements while maintaining the same transmission power,
   detecting the plurality of transmissions sent by the different combinations of send elements using the at least one receive transducer of the receive arrangement,
   determining which of the tested combinations of send elements resulted in the strongest received transmission being received at the receive arrangement,
   activating the send elements in the combination which resulted in the strongest received transmission, and deactivating the remaining elements of the send array;
   after the array has been optimized, sending transmissions from the send arrangement using the activated elements of the send array, and receiving said transmissions using the at least on receive transducer.

2. The method of acoustical transmission according to claim 1, wherein the optimization step further comprises:
   sending a first transmission using a first subset of the send elements in the send array, and detecting the first transmission, or the absence of the first transmission, at the receive arrangement;
   activating at least one additional send element which was not active in the first subset, thereby forming a second subset of send elements;
   sending a second transmission using the second subset of send elements but the same total transmission power as used for the first transmission, and detecting the second transmission, or the absence of the second transmission, at the receive arrangement;
   comparing the transmissions detected at the receive arrangement;
   if the second transmission resulted in a stronger signal being received at the receive arrangement than the first transmission, leaving said additional send element active; and
   if the second transmission resulted in a weaker signal being received at the receive arrangement than the first transmission, deactivating said at least one additional send element.

3. The method of acoustical transmission according to claim 1, wherein the optimization step further comprises:
   sending a first transmission using a first set of the send elements in the send array, and detecting the first transmission, or the absence of the first transmission, at the receive arrangement;
   deactivating at least one test send element which was active in the first set, thereby forming a second subset of send elements;
   sending a second transmission using the second subset of send elements but the same total transmission power as used for the first transmission, and detecting the second transmission, or the absence of the second transmission, at the receive arrangement;
   comparing the transmissions detected at the receive arrangement;
   if the second transmission resulted in a stronger signal being received at the receive arrangement than the first transmission, leaving said at least one test send element deactivated; and
   if the second transmission resulted in a weaker signal being received at the receive arrangement than the first transmission, reactivating said at least one test send element.

4. The method of acoustical transmission according to claim 1:
   wherein the first surface and the second surface of the channel medium are capable of movement relative to each other; and
   wherein the optimizing step is repeated at least periodically.

5. The method of acoustical transmission according to claim 1:
   wherein the first surface and the second surface of the channel medium are not rigidly connected and therefore move with relation to each other;
   wherein the optimizing step is run substantially continuously when the system is in use.

6. The method of acoustical transmission according to claim 1:
   wherein the receive arrangement comprises a receive array coupled to the second surface, the receive array comprising a plurality of receive elements, and the receive elements each comprising a transducer;
   wherein the send array and the receive array are at least partially opposite each other across the channel medium; and
   wherein the transmissions sent from the send array are received by the receive array.

7. The method of acoustical transmission according to claim 1:

wherein the optimizing step comprises measuring and comparing transmission energy from the plurality of transmissions that is reflected back to the first surface from the second wall, the second surface, and/or the receive arrangement.

8. The method of acoustical transmission according to claim 1:
wherein the optimizing step comprises using an algorithm in which send elements are turned on and off to actively search for a set of send elements which results in the strongest transmission signal being received at the receive arrangement.

9. The method of acoustical transmission according to claim 1, wherein the send array comprises a plurality of send elements arranged in a grid pattern on the first surface, the grid pattern having a plurality of elements on each side of the grid.

10. The method of acoustical transmission according to claim 1, wherein the method is used for acoustical transmission of power through the channel medium;
wherein the optimizing step comprises deactivating send elements at the first surface which are not well aligned with the receive arrangement at the second surface in order to avoid transmitting power which will not be received by the receive arrangement;
the method also comprising, after the optimizing step, sending transmissions through the channel medium using an optimal subset of the send elements determined by the optimizing process;
receiving the transmissions at the receive arrangement;
turning the acoustical energy of the transmissions into electrical energy using the at least one receive transducer; and
using the power generated by the at least one receive transducer to power electronics and/or to charge a battery.

11. The method of acoustical transmission of power according to claim 10, wherein each element of the transmit array has its own electrical matching network, and also its own in-line switch which is adapted to activate or deactivate each respective send element;
wherein said in-line switches are used to activate and deactivate respective transmit elements of the transmit array.

12. The method of acoustical transmission according to claim 1, wherein the method is used for acoustical transmission of at least one of data and instructions through the channel medium;
wherein the receive arrangement comprises a receive array, the receive array comprising a plurality of receive elements, and the receive elements each comprising a transducer;
wherein the method further comprises the additional step of optimizing the receive array by identifying and activating at least a subset of receive elements at the second surface which are sufficiently aligned with send elements on the opposite first surface of the channel medium for effective communication;
sending transmissions from the activated send elements and receiving those transmissions with the activated receive elements; and
translating the transmissions received by the activated receive elements into at least one of data and instructions.

13. The method of acoustical transmission according to claim 12, wherein MIMO processing is applied to data prior to transmission by the send arrangement; and
wherein a MIMO precoding module controls individual send elements to create and control the transmissions of data and/or signals by the send elements.

14. The method of acoustical transmission according to claim 13,
wherein a digital to analog converter converts a digital signal to an analog signal before transmission through the channel medium;
wherein an analog to digital converter converts the transmitted signal to a digital signal after transmission through the channel medium; and
wherein a MIMO decoding module decodes the signal after transmission through the channel medium.

15. The method of acoustical transmission according to claim 1, wherein the method is used for transmissions between the interiors of two at least partially submerged bodies;
wherein the channel medium comprises a first wall comprising the first surface, a second wall comprising the second surface, and liquid between the first wall and the second wall, and wherein some motion between the first wall and the second wall is possible;
the method further comprising periodically or continually repeating the optimizing step to compensate for any movement between the walls, the respective surfaces, and the send and receive arrays.

16. The method of acoustical transmission according to claim 15, wherein at least one of the submerged bodies is a water craft, wherein at least one of the first wall and the second wall is a water craft hull, wherein the channel medium comprises water and at least one water craft hull.

17. The method of acoustical transmission according to claim 1,
wherein the receive arrangement comprises a receive array engaged to the second surface, the receive array comprising a plurality of receive elements comprising transducers;
wherein the send array and the receive array are both comprised of substantially square or substantially rectangular elements arranged in a grid pattern, the grid patterns having a plurality of elements on each side;
wherein send elements which have transmission sending faces pointed directly at one or more receive elements are activated and used to send transmissions;
wherein send elements which do not have transmission sending faces pointed at or near a receive element are deactivated and not used to send transmissions.

18. The method of acoustical transmission according to claim 1, wherein a plurality of the send elements in the send array are physically spaced apart from each other, wherein the spaced apart elements are used to send transmissions to the receive arrangement.

19. The method of acoustical transmission according to claim 18 wherein the receive arrangement comprises a receive array engaged to the second surface, the receive array comprising a plurality of receive elements each comprising a transducer;
wherein the transmissions generated by a plurality of the spaced apart send elements each excite a plurality of receive elements due to acoustic spreading.

20. The method of acoustical transmission according to claim 1, wherein the receive arrangement comprises a receive array engaged to the second surface, the receive array comprising a plurality of receive elements each comprising a transducer;
the method also including the step of optimizing the receive array, wherein optimizing the receive array comprises sending transmissions from the send array, measuring an amount of transmitted energy captured at each of a plurality of receive elements in the receive array, and selecting a subset of receive elements that are receiving higher levels of transmitted energy to be activated, and deactivating other receive elements which are receiving lower levels of transmitted energy;

the method further comprising, after optimizing the receive array, sending transmissions from the send array, and receiving said transmissions with only the activated receive elements.

21. The method of acoustical transmission according to claim 1,
wherein the receive arrangement comprises a receive array engaged to the second surface, the receive array comprising a plurality of receive elements each comprising a transducer;
wherein the channel medium is at least partially curved, and wherein the first surface and the second surface comprise curved surfaces;
wherein the send array and a portion of the first surface it is fixed to are both at least partially curved, and
wherein the receive array and a portion of the second surface it is fixed to are both at least partially curved.

22. A method of optimizing and using an acoustic-electric channel including piezoelectric transducer arrays, the method comprising:
providing a channel medium for passing acoustical transmissions, the channel medium comprising a first surface and a second surface, the channel medium being capable of transmitting acoustical energy there through;
providing a first arrangement coupled to the first surface and a second arrangement coupled to the second surface, wherein the first and second arrangements are positioned at least partially on opposite sides of the same region of the channel medium;
wherein the first arrangement comprises a first array coupled to the first surface, the first array comprising a plurality of first array elements, each first array element comprising a transducer, wherein each first array element can be controlled independently of other elements in the first array;
wherein the second arrangement comprises a second array coupled to the second surface, the second array comprising a plurality of second array elements, each second array element comprising a transducer, wherein each second array element can detect received transmissions independently of transmission detection at other second array elements;
optimizing the acoustic-electric channel using a sounding process, the optimizing step comprising individually exciting each first element of the first array one at a time to send a transmission through the channel medium, while simultaneously monitoring the received transmission or absence of received transmissions at each second element, thereby mapping which first elements effectively send transmissions to each of the second elements,
the optimizing step further comprising activating first elements which are capable of sending effective transmissions to at least a threshold number of second elements, and deactivating the remaining first elements; and
after the optimizing step, sending transmissions from the first arrangement using only the activated first elements.

23. A method of designing and constructing a dual transducer array acoustic-electric channel between transducer arrays coupled to moving surfaces, the method comprising:
providing a channel medium for passing acoustical transmissions, the channel medium comprising a first surface and a second surface which can move relative to each other, the channel medium being capable of transmitting acoustical energy there through;
determining performance requirements for the acoustic-electric channel;
determining a theoretical minimum transducer footprint required for a first array of the acoustic-electric channel to achieve the performance requirements if the first and second surfaces are stationary, and selecting two dimensions $L_{min1}$ and $L_{min2}$ for a transducer array having at least the minimum footprint;
determining maximum expected alignment errors $\epsilon_{max1}$ and $\epsilon_{max2}$ in each of two dimensions, the alignment errors corresponding to the maximum expected relative movement of first surface and second surface in the respective dimensions;
providing a first array having a first dimension of not less than $L_{min1}+\epsilon_{max1}$, and a second dimension of not less than $L_{min2}+\epsilon_{max2}$, wherein each dimension of the first array includes a plurality of first array elements, each element comprising a transducer;
coupling the first array with the first surface of the channel medium; and
providing a second array coupled to the second surface of the channel medium which, in an operable state, is at least partially opposite the first array.

24. The method of designing and constructing a dual transducer array acoustic-electric channel of claim 23, wherein the step of providing a second array comprises:
determining a theoretical minimum transducer footprint required for the second array of the acoustic-electric channel to achieve the performance requirements if the first and second surfaces are stationary, and selecting two dimensions $L_{min3}$ and $L_{min4}$ for a second transducer array having at least the minimum footprint;
providing the second array having a first dimension of not less than $L_{min3}+\epsilon_{max1}$, and a second dimension of not less than $L_{min4}+\epsilon_{max2}$, wherein each dimension of the second array includes a plurality of second array elements, each element comprising a transducer; and
providing the second array on the second surface of the channel medium in a position which, in an operable state, is at least partially opposite the first array.

25. The method of designing, constructing, and operating a dual transducer array acoustic-electric channel between moving surfaces of claim 23, the method further comprising:
optimizing at least the first array, wherein the optimization process comprises:
sending a plurality of transmissions using different combinations of first array elements,
detecting the plurality of transmissions sent by the different combinations of first array elements using the second array,
determining which of the tested combinations of first array elements resulted in the strongest received transmission being received at the second array,
activating the first array elements in the combination which resulted in the strongest received transmission at the second array, and deactivating the remaining first array elements;
after the first array has been optimized, sending transmissions from the first array using only the activated elements of the first array, and receiving said transmissions using the second array.

26. The method of designing, constructing, and operating a dual transducer array acoustic-electric channel between moving surfaces of claim 25, further comprising repeating the step of optimizing at least the first array either periodically or continuously to compensate for any relative movement of the first array and second array.

* * * * *